United States Patent
Wang

(10) Patent No.: US 7,184,671 B2
(45) Date of Patent: Feb. 27, 2007

(54) OPTICAL TRANSMISSION CONTROLLER

(75) Inventor: Xiangzhong Wang, Fremont, CA (US)

(73) Assignee: Opnext, Inc., Eatontown, NJ (US)

( * ) Notice: Subject to any disclaimer, the term of this patent is extended or adjusted under 35 U.S.C. 154(b) by 113 days.

(21) Appl. No.: 10/665,098

(22) Filed: Sep. 16, 2003

(65) Prior Publication Data

US 2005/0058460 A1    Mar. 17, 2005

(51) Int. Cl.
*H04B 10/04* (2006.01)

(52) U.S. Cl. .................................. 398/195; 398/198

(58) Field of Classification Search ........ 398/195–198; 359/239
See application file for complete search history.

(56) References Cited

U.S. PATENT DOCUMENTS

| | | | |
|---|---|---|---|
| RE35,716 E * | 1/1998 | Stapleton et al. ............... 435/3 |
| 5,900,621 A * | 5/1999 | Nagakubo et al. .......... 250/205 |
| 6,285,476 B1 * | 9/2001 | Carlson et al. ................ 398/9 |
| 6,590,686 B1 * | 7/2003 | Sekiya et al. ............... 398/183 |
| 6,836,622 B2 * | 12/2004 | Kobayashi et al. ......... 398/198 |
| 6,842,587 B1 * | 1/2005 | McGhan et al. ............ 398/201 |
| 2005/0249468 A1 * | 11/2005 | Aronson et al. .............. 385/92 |

OTHER PUBLICATIONS

Article 34 Amendment filed on Jul. 29, 2005, in counterpart PCT Application No. PCT/US2004/030349.
International Preliminary Report on Patentability mailed Dec. 15, 2005, in counterpart PCT Application No. PCT/US2004/030349.

* cited by examiner

*Primary Examiner*—Leslie Pascal
(74) *Attorney, Agent, or Firm*—Finnegan, Henderson, Farabow, Garrett and Dunner, L.L.P.

(57) ABSTRACT

An optical transmission controller for controlling an optical transmission system is presented. The optical transmission controller according to the present invention includes a laser controller, a modulator block controller, and a modulation driver controller. In some embodiments, the optical transmission controller is formed on a single integrated circuit chip. In some embodiments, the optical transmission controller includes a digital signal processor or microprocessor executing instructions for providing signals to a laser module, a modulator block and modulation drivers.

14 Claims, 8 Drawing Sheets

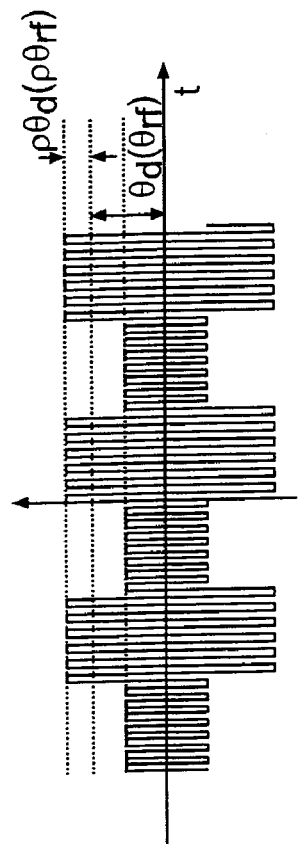

FIG. 7A

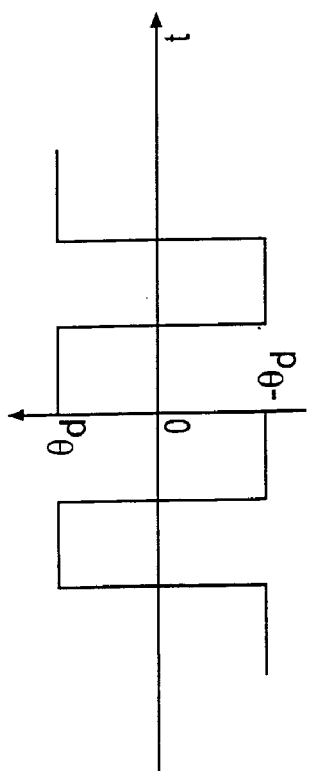

FIG. 7B

| BIAS MODE | RF DRIVING | ERROR SIGNAL AMPLITUDE NORMALIZED TO $P_m$ |
|---|---|---|
| GATED SQUARE DITHER TO DC PORT FOR QUAD+ CONTROL | SINUSOIDAL | $-2/\pi * \sin\theta_{dc} * \sin\theta_d * \sin(\rho\theta_d) * \text{BesselJ}(0, \theta_{rf})$ |
| | SQUARE DIGITAL | $-2/\pi * \sin\theta_{dc} * \sin\theta_d * \sin(\rho\theta_d) * \cos\theta_{rf}$ |
| SQUARE DITHER TO MODULATOR DRIVER FOR QUAD+ CONTROL | SINUSOIDAL | $-\rho/\pi * \sin\theta_{dc} * [1-\text{BesselJ}(0, 2\theta_{rf})]$ |
| | SQUARE DIGITAL | $-2/\pi * \sin\theta_{dc} * \sin\theta_{rf} * \sin(\rho\theta_d)$ |
| SQUARE DITHER TO DC PORT FOR PEAK CONTROL | SINUSOIDAL | $-2/\pi * \sin\theta_{dc} * \sin\theta_d * \text{BesselJ}(0, \theta_{rf})$ |
| | SQUARE DIGITAL | $-2/\pi * \sin\theta_{dc} * \sin\theta_d * \cos\theta_{rf}$ |

FIG. 7C

OPTICAL TRANSMISSION CONTROLLER

BACKGROUND

1. Field of the Invention

The present invention relates to optical transmission of data and, in particular, an optical transmission controller for controlling the optical transmission of data.

2. Discussion of Related Art

In general, optical transmission of data requires a laser, optical modulators, and coupling of light into an optical fiber. Therefore, parameters associated with the stability and output power of the laser, the optical modulators, and the total output power of the optical transmitter need to be controlled. Currently, developers of optical data transmission equipment assemble and debug equipment with modular components from various vendors in order to perform these tasks. Integrating these various components into a complete and operational transmission system is often a difficult and time-intensive undertaking.

At present, no integrated solution exists for general optical applications in which it is required to drive a laser, control the optical modulators according to a modulation scheme, and control the overall output power of the optical transmission system. As presently practiced, each of these functions may be performed by an individual integrated circuit solution. For example, the Hytek temperature control module, manufactured by Hytek Microsystems of Carson City, Nev., is designed to stabilize the operating temperature of a laser diode device. Further, Pacific Wave Communications Mach-Zehnder modulators, manufactured by Pacific Wave Industries, Los Angeles, Calif., provide control of the modulators. Each device can be integrated into an overall control system, which typically requires a substantial investment of engineering resources. For example, each device must be controlled by a software control program, and therefore requires interfacing with a computerized control system. The software control process is complicated when each component is controlled by different, and often incompatible, interface protocols and command sets.

Additionally, in optical transmission systems with electro-opto signal modulation devices such as lithium niobate ($LiNbO_3$) Mach-Zehnder modulators, DC bias voltage stabilization is very important. The various bias control methodologies discussed (See, e.g., U.S. Pat. Nos. 5,003,624; 5,453,608; and 5,726,794), have important limitations.

One limitation with previously proposed methodologies is in bias drift detection. Bias drift detection is based on time-domain waveform analysis of the signal strength at the modulator output in response to a pilot tone or dither tone modulation applied to the modulator DC bias port. Very low waveform distortion and large pilot tone amplitude are required for good control accuracy, which in time can cause large interference in the modulator output beams.

Another limitation is that the pilot tone applied to the modulator DC bias port and detection circuit relies on changes in the average optical power output by the modulator measured in response to the dither tone modulation. This method does not work when a large RF signal is present at the modulator RF port because the average power remains relatively constant with little change. As an example, an NRZ data signal with an amplitude equal to the $V_\pi$ of the modulator, as is the case in many such data transmission systems, has a constant average optical signal output power that is independent of any particular bias voltage.

An additional limitation is that these methods can only stabilize the bias voltage for a single modulator and in some cases only at the linear operating point. However, there is a need to bias modulators at points other than the linear operating point. Additionally, transmission systems typically include more than one modulator in order to implement complex data-encoding schemes.

Therefore a need exists for the integration of the various functions of the optical control circuitry onto a single chip or board. There further is a need to interface the optical control circuitry in a convenient way with an outside environment, such as, for example, a computer system. Further, there is a need for optical control circuitry that can operate with multiple modulators and various RF signal inputs in order to support complex data transmission systems.

SUMMARY

In accordance with the present invention, an optical transmission controller for controlling an optical transmission system is presented. The optical transmission controller according to the present invention includes a laser controller, a modulation controller, and a modulation driver controller. In some embodiments, the optical transmission controller is formed on a single integrated circuit chip. In some embodiments, the optical transmission controller includes a digital signal processor or microprocessor executing instructions for providing signals to a laser module, a modulator block and modulation drivers.

In accordance with embodiments of the present invention, an architecture is presented that integrates the various control functions needed to control optical transmission in optical data transmission paths. The architecture includes the hardware required to drive the laser and control its operating temperature, the control circuitry to properly bias and control the laser modulator, and the feedback circuitry to control the laser modulator power output. The integrated circuit is user configurable, and is capable of implementing any of a number of bias control methodologies, under firmware control. In some embodiments, the bias control methodologies can stabilize bias voltage at any one of the linear operation points, peak point and null point for Mach-Zehnder based electro-optic modulators with any RF signal inputs.

According to an embodiment of the present invention, the integrated circuit is capable of controlling two laser modulators simultaneously, or it may control only one. Multiple feedback control loops are provided which can be configured according to the application. These and other embodiments of the present invention are illustrated further below with reference to the following figures.

BRIEF DESCRIPTION OF THE DRAWINGS

FIGS. 7A and 7B show examples of dither signals.

FIG. 7C shows a table of the error signal amplitude for each of the control schemes.

In the figures, elements having the same designation have the same or similar functions.

DETAILED DESCRIPTION

Figure 1:
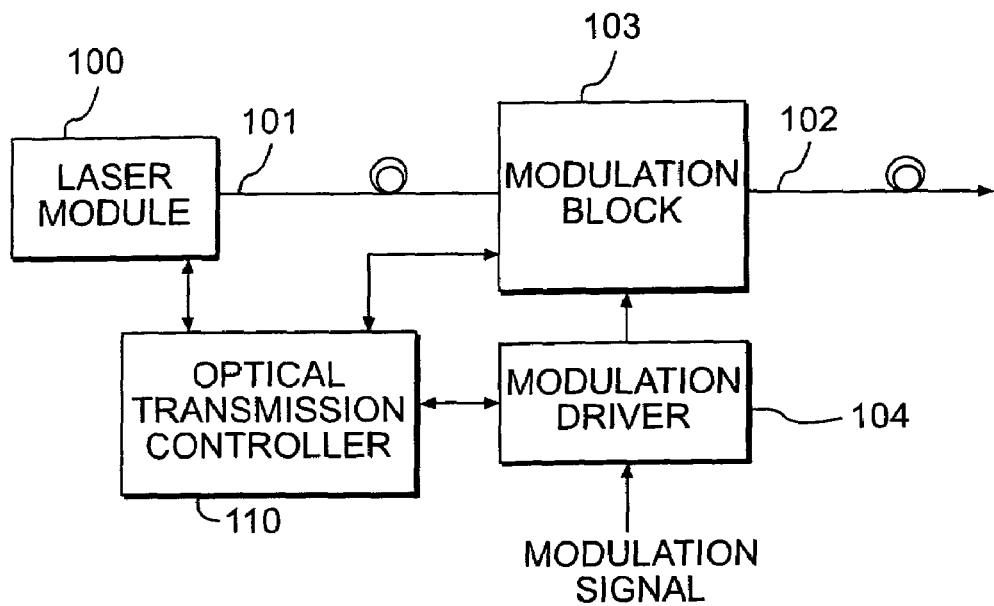
FIG. 1 shows an optical transmission system with an optical transmission controller chip according to the present invention.

FIG. 1 shows a simplified schematic diagram of an optical transmission system with an optical transmission controller 110 according to the present invention. An optical transmission system includes a laser module 100 providing laser light to a modulation block 103. Modulation block 103 can be coupled to an optical fiber 102 for output of an optical signal. Modulation block 103 includes one or more individual modulators that control the optical intensity of light coupled to fiber 102 in response to an electrical driving signal from modulation driver 104. Modulation driver 104 receives modulation signals and produces the electrical driving signals for controlling modulators in modulation block 103 in response to the modulation signals. In some embodiments, laser module 100 can be coupled to modulation block 103 through an optical fiber 101.

Each of laser module 100, modulation block 103, and modulation driver 104 can include devices for controlling and monitoring certain operational values within the transmission system. For example, laser module 100 may include a temperature sensor and a wavelength monitoring device. Modulation block 103 may include DC offsets and other control units for the modulators, which may be Mach-Zehnder type modulators. Modulation block 103 may also include output power monitoring and control devices such as a photodetector and a voltage controlled variable optical attenuator. Further, modulation driver 104, which provides the electrical driving signals for controlling the modulators in modulation block 103, may include output RF level detection devices and a voltage controlled attenuator.

In accordance with the present invention, an optical transmission controller 110 is coupled to control the various devices of laser module 100, modulation block 103 and modulation driver 104. In some embodiments, optical transmission controller 110 can be formed on a single integrated circuit chip. The controller functions can be formed from digital circuitry or may include a processor executing firmware.

Optical transmission controller 110 can include monitoring and feedback circuitry for control of any parameters of laser module 100 and modulation block 103. Some common parameters include the temperature and operating wavelength of laser module 100, DC offsets for modulators in modulation block 103, average power output from modulation block 103 into optical fiber 102, and the gain of drivers in modulation driver 104. Modulation block 103 can include any number of different modulators for applying modulation to the laser light received by optical fiber 101. Modulation driver 104, then, includes drivers for the modulators of modulation block 103.

Figure 2:
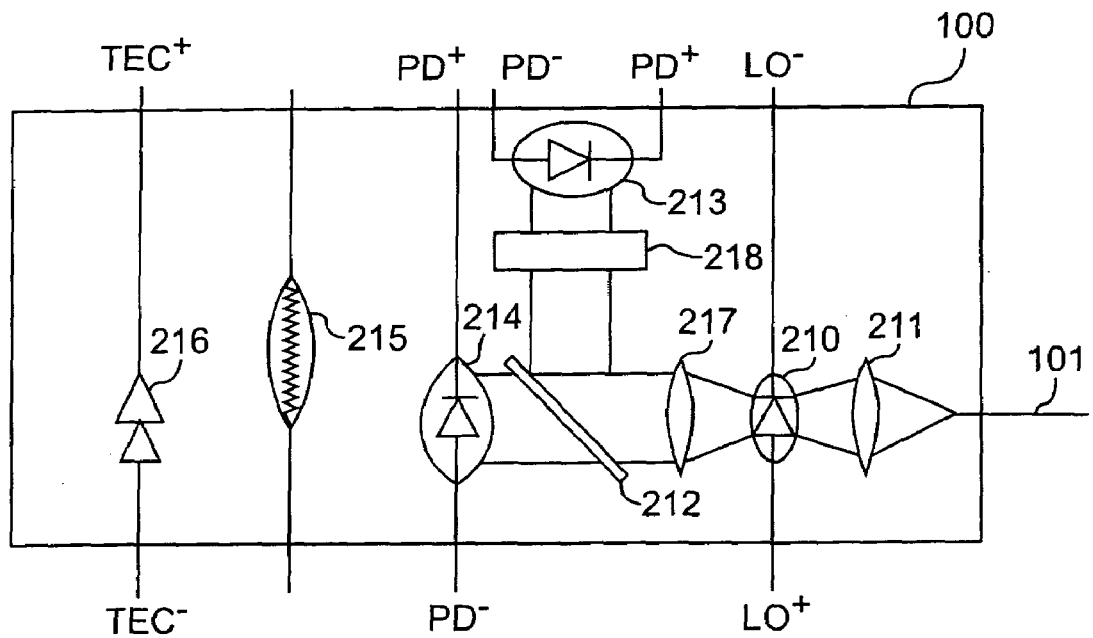
FIG. 2 shows a typical laser module such as that shown in FIG. 1.

FIG. 2 shows an example of a laser module 100. Laser module 100 includes a laser diode 210 which produces light when a current is supplied through leads LO⁻ and LO⁺. Light from laser diode 210 can be coupled to optical fiber 101 through coupling lens system 211.

Light from laser diode 210 may also be collimated by lens system 217 and directed onto beam splitter 212. One beam from beam splitter 212 is incident on photodiode 214. The other beam from beam splitter 212 is incident on photodiode 213, after being directed through a filter 218. Filter 218 may include a Fabry-Perot interferometer, which provides an optical signal that is sensitive to wavelength. The output signal on leads PD⁻ and PD⁺ of photodiode 214, the reference signal, indicates the light incident on photodiode 214 and therefore is responsive to the total light output of laser diode 210. The output signal on leads PD⁻ and PD⁺, the wavelength signal, of photodiode 213 indicates the light incident on photodiode 213, which is wavelength dependent due to filter 218. Therefore, the operating wavelength of laser module 100 can be monitored by comparing the wavelength signal from photodiode 213 with the reference signal from photodiode 214.

Figure 3:
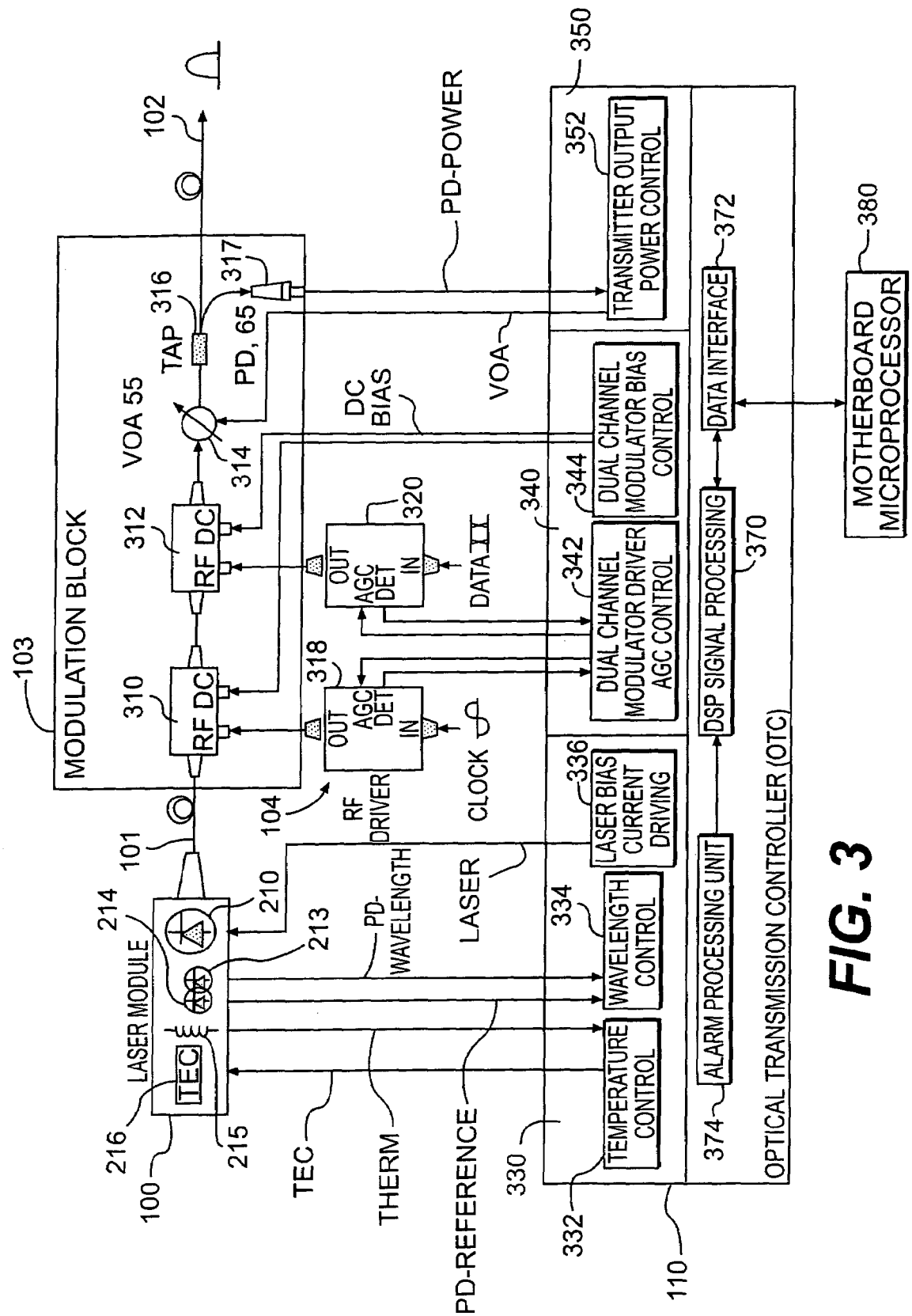
FIG. 3 shows a simplified block diagram of a data transmission system with an embodiment of an optical transmission controller according to the present invention.

FIG. 3 illustrates a simplified schematic for an optical transmission controller 110 according to the present invention in an optical transmission system. Optical transmission controller 110 is coupled to laser module 100, modulation block 103, and modulation drivers 104 as is illustrated in FIG. 1. In the embodiment shown in FIG. 3, laser module 100 includes a thermal electric cooler (TEC) 216, thermistor 215, photodiodes 213 and 214 and laser diode 210, as is illustrated in FIG. 2.

The embodiment of modulation block 103 shown in FIG. 3 includes two modulators 310 and 312, variable optical attenuator 314, and a photodiode 317 which receives light from tap 316. Modulator 310 is driven by modulator driver 318 and modulator 312 is driven by modulator driver 320. Embodiments of optical transmission controller 110 according to the present invention can be coupled to control embodiments of modulation block 103 with any number of modulators such as modulators 310 and 312 and with any number of other optical components. The embodiments of the optical transmission system shown in FIG. 3 allow modulation of the optical signal with a clock frequency in addition to the signal modulation for transmission of the data signals with an optical return-to-zero (Rz) encoding technique. In general, other encoding schemes can be implemented utilizing various numbers of modulators in modulation block 103.

Laser module 100 may be, for example, the CQF975/508 series laser module manufactured by JDS Uniphase of Ottawa, Ontario, Canada. Laser modulators 310 and 312 may be, for example, the OC 192 modulators also manufactured by JDS Uniphase. Modulator drivers 318 and 320 may, for example, be the H302 series drivers manufactured by JDS Uniphase. The modulators may or may not also include a variable optical attenuator (VOA). Some laser modulators may additionally include a VOA and laser output power detector, which can also be utilized with some embodiments of optical transmission controller according to the present invention.

As shown in FIG. 3, optical transmission controller 110 can be divided into three functional areas: a laser controller 330; a modulator controller 340; and an optical power controller 350. In some embodiments, optical transmission controller 110 includes a digital signal processor (DSP) 370 coupled to a data interface 372 for communication with an external processor 380, which could be an external computer. In some embodiments, an alarm processing unit 374 detects fault states of the device, such as over temperature or over current for laser module 100. DSP 370 provides signal processing support for each of the three functional units, temperature controller 330, bias controller 340, and optical output controller 350.

In some embodiments, laser controller 330 can include temperature controller 332, wavelength controller 334, and laser bias and current driving circuit 336. In some embodiments, the wavelength of light produced by laser module 100 is temperature dependent so that a method of wavelength control is to control the temperature.

Modulator controller 340 includes modulator driver control 342 and modulator bias control 344. Modulator driver control 342 includes circuitry for controlling an RF driver and may include an automatic gain control (AGC) circuit. Modulator bias control 344 controls a bias on an optical modulators 310 and 312.

Figure 4:
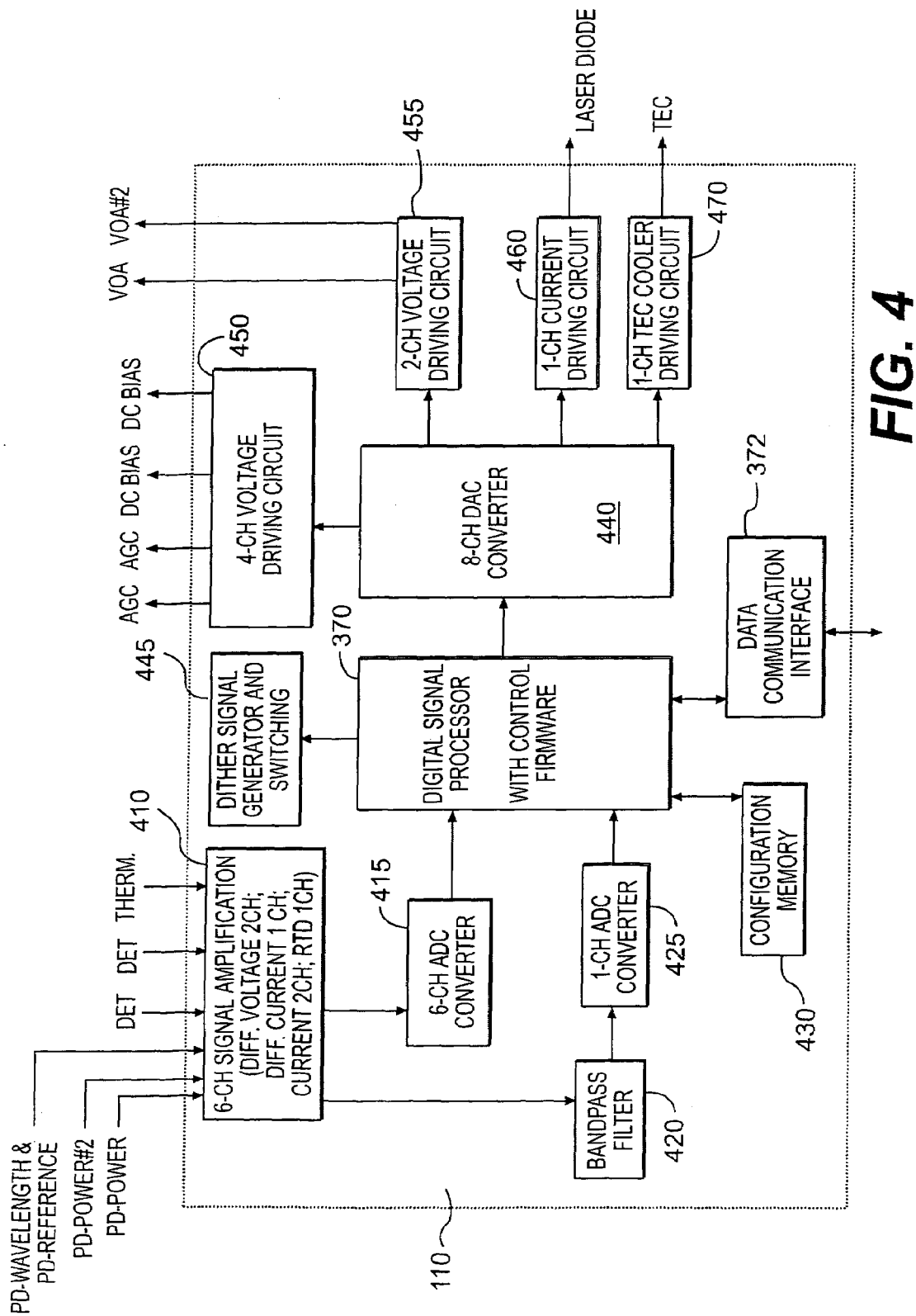
FIG. 4 shows a block diagram of an embodiment of an optical transmission controller according to the present invention.

FIG. 4 shows a simplified schematic diagram of an embodiment of optical transmission controller 110 appropriate for the transmission system illustrated in FIG. 3. The embodiment of optical transmission controller 10 is digital signal processor based and includes DSP 370. Signals from the optical transmission system are received into a signal amplification circuit 410. Compatible with the embodiment of optical transmission controller shown in FIG. 3, signal amplification circuit 410 may include receipt of six-channels. As shown in FIG. 4, thermistor resistance, single-ended or differential currents and voltages can be received. For example, signals from thermistor 215 (Therm) can be received as RTD, signals from photodiodes 213 and 214 (PD-reference and PD-wavelength) can be received as differential current signals, signals from modulation drivers 318 and 320 (DET) can be received as differential voltage signals, and signals from photodiode 317 (PD-Power) can be received as current signals. In some embodiments, controller 10 may include extra input signals to receive other possible signals. In some embodiments, signal conditioning circuit 410 can include analog filters for signal conditioning.

Signals from signal conditioning circuit 410 can then be input to ADC converter 415, which can be a six-channel analog-to-digital converter. ADC converter 415 can be controlled and sampled by DSP 370. Additionally, signals related to the signal power (PD-Power) are input to bandpass filter circuits 420. The output signals from bandpass filter circuits 420 can be input to ADC converter 425, which can be controlled and sampled by DSP 370. As discussed in more detail below, in order to monitor and control the DC bias to modulators 310 and 312 (see FIG. 3), a small modulation (a dither signal) is generated and added by dither signal generator and switching circuit 445 to the DC bias signals supplied to modulators 310 and 312, or to the AGC driving signals supplied to modulator drivers 318 and 320. Bandpass filter circuit 420, then, detects the components of the output power in signals related to the signal power that correspond to the dither frequencies.

Therefore, in the embodiment of optical transmission controller shown in FIG. 4, DSP 370 receives digital signals related to the thermistor signal, the reference signal from PD 214 (PD-Reference), the wavelength dependent signal from PD 213 (PD-Wavelength), the detectors of each of modulator drivers 318 and 320 (DET), the signal power (PD-Power), and the components of the signal power (PD-Power) corresponding to the dither frequencies. In some embodiments, ADC converters 415 and 425 may be included in DSP 370.

DSP 370 is coupled with a memory 430, which stores firmware code executed by DSP 370 and storage memory for performing calculations on the digital signals received. Memory 430 can include any combination of volatile and non-volatile memory. For example, part of memory 430 can be FLASH memory for storage of firmware code and operating parameters while part of memory 430 can include DRAM or SRAM memory for storage of data while calculations are being performed and the firmware code stored in the FLASH memory is executed. Volatile and non-volatile memory may be formed on the same integrated circuit with DSP 370.

DSP 370 is also coupled to data communication interface 372. Interface 372 can be any interface for communicating data between optical transmission controller 110 and an external device such as a computer. In some embodiments, firmware and operating parameters to configure optical transmission controller 110 to a particular optical transmission system can be loaded through interface 372. Further, upgrades to software can be made through interface 372. Finally, monitoring of the optical transmission system can be performed through communication with DSP 370 through interface 372.

DSP 370 calculates control values for controlling the optical transmission system according to the firmware stored in memory 430. The output values for control values are then written into a digital-to-analog controller (DAC) register 440. The digital signals stored in DAC register 440 are then utilized to control drivers 450, 455, 460 and 470 to generate analog parameters that are output to components of the optical transmission system such as laser module 100, modulation block 103, and modulation drivers 104.

In the embodiment shown in FIG. 4, compatible with the embodiment of optical transmission system shown in FIG. 3, DAC register 440 is an 8-channel register. Six channels are input to voltage driving circuit 450 and 455, one channel is input to current driving circuit 460, and one channel is input to TEC driving circuit 470. Driving circuit 450 provides automatic gain control (AGC) voltage input signals to modulator drivers 318 and 320, and DC bias voltage inputs to modulators 310 and 312. Driving circuit 455 provides voltage input to control VOA 314 and other possible optical attenuators. Current driver 460 provides the current to laser diode 210. TEC cooler driving circuit 470 provides the current and voltage signals to thermal-electric-cooler (TEC) 216.

Figure 5A:
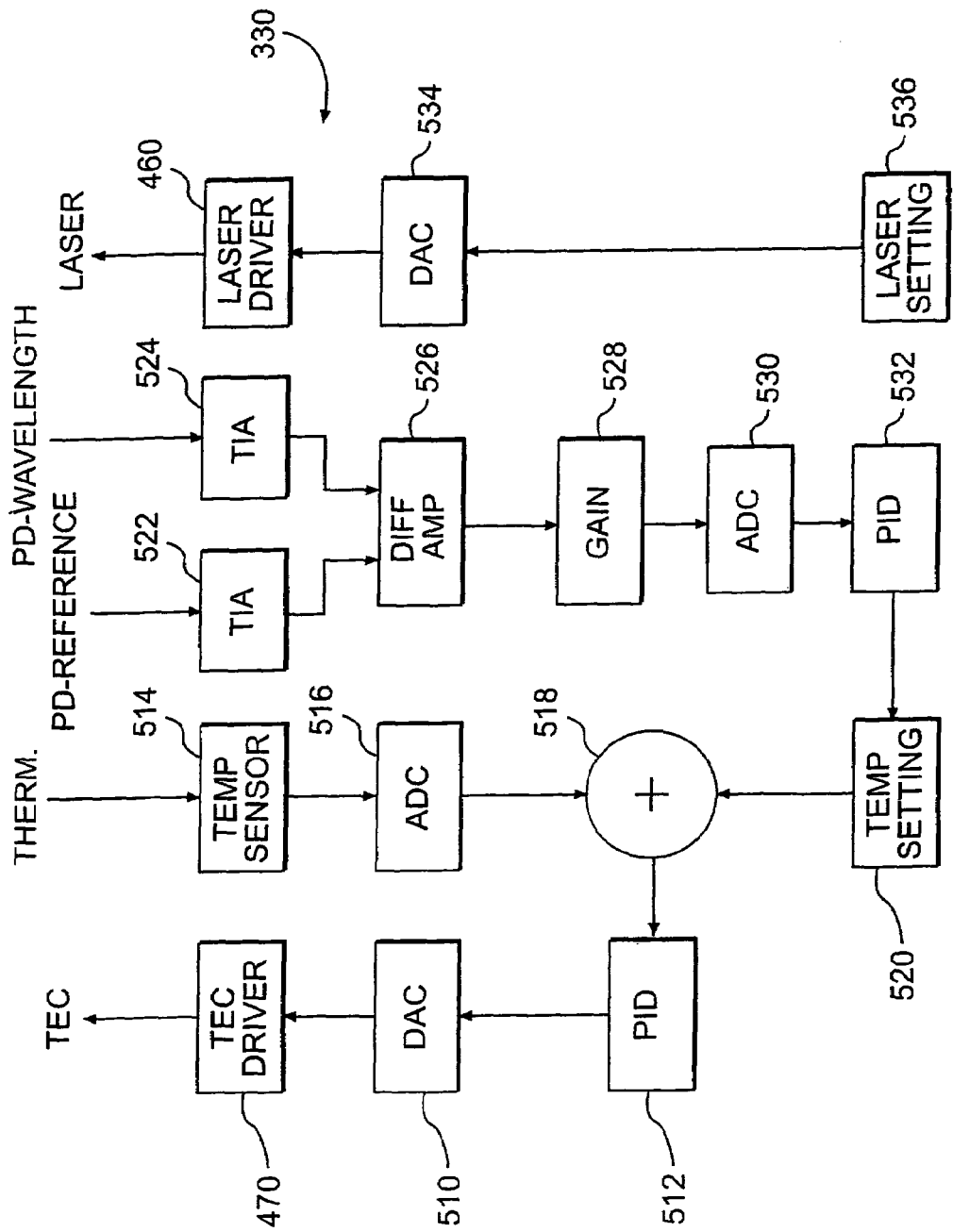
FIGS. 5A and 5B show more detailed block diagrams of an embodiment of an optical transmission controller circuit according to the present invention.
Figure 5B:
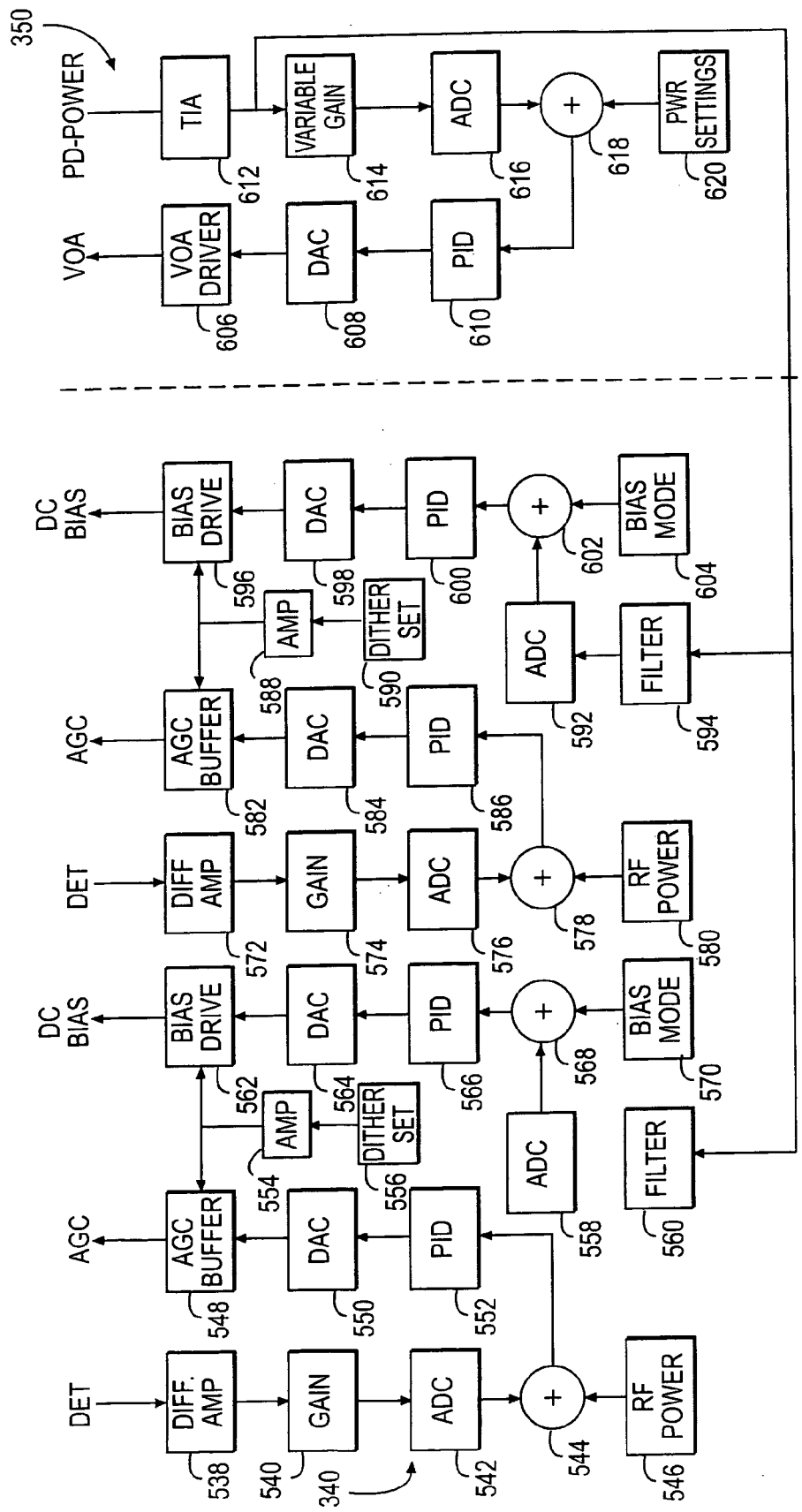

FIGS. 5A and 5B show a more detailed block diagram of an optical controller circuit 110 according to the present invention. Laser controller section 330 is shown in FIG. 5A while modulation controller section 340 and power controller section 350 are shown in FIG. 5B.

An embodiment of laser controller section 330 is shown in further detail in FIG. 5A. As is shown in FIG. 2, the optical beam from laser diode 210 is divided in laser module 100 into two beams, one beam directed into optical filter 218, and a reference beam, by beam splitter 212. Optical filter 218 may be a Fabry-Perot interferometer, which outputs a beam with intensity depending on the wavelength of the optical beam from beam splitter 212. The optical beam from filter 218 is incident on photodiode 213, which provides a current signal dependent on the intensity of the beam incident upon photodiode 213. The reference beam is incident on photodiode 214 which provides a reference current signal related to the intensity of light incident upon it.

As shown in FIG. 5A, the reference signal (labeled PD-reference) is incident on trans-impedance amplifier (TIA) 522 of optical transmission controller 110. The wavelength signal (labeled PD-wavelength) is incident on TIA 524. The voltage signal from each of trans-impedance amplifiers 522 and 524 is compared in a differential amplifier 526, and the difference signal is amplified by a variable gain stage 528. The signal from gain stage 528 is input to ADC 530 to produce a digital error signal. The digital error signal is then processed by a proportional-integral-differential (PID) control circuit 532, which determines the value of a new temperature setting in temperature setting 520.

In the embodiment of laser module 100 shown in FIG. 2, the temperature is measured with a thermistor 215. The signals from thermistor 215 are input to temp sensor 514 in optical transmission controller 110. In general, temperatures can be measured with any appropriate temperature sensor, including thermocouples or other devices. Temperature sensor 514 receives a signal indicative of the temperature of laser module 100 and outputs a voltage signal to ADC related to the temperature. The digital signal from ADC is compared with the signal from temperature setting 520 in adder 518. The error signal from adder 518 is input to PID 512, which determined a new voltage setting for thermoelectric cooler (TEC) 216. The digital output signal from PID 512 is converted into an analog signal by DAC 510 before being output to TEC driver 470, which may amplify the voltage by a predetermined amount. The output signal from TEC driver 470, TEC, is then input to thermoelectric cooler 216. The temperature of the laser module, which also may control the wavelength of the light output by laser diode 210, can thereby be controlled through direct bi-lateral communication between laser module 100 and temperature control 332 without substantially impacting the power output of laser diode 210.

Laser controller 330 also includes laser driver 460, which outputs a current to drive laser diode 210 in laser module 110. Laser diode 210 is controlled in response to a laser setting in laser setting 536, which can be controlled externally through interface 372 (FIG. 4) and can be a parameter stored in memory 430. The user selected value is input to DAC 534, which produces an analog signal that is input to laser driver 460. Laser driver 460 then outputs the laser current to laser module 100 for laser diode 210.

As shown in FIG. 1 and FIG. 3, the optical output from laser module 100 is coupled into optical fiber 101 and received by modulation block 103. Although modulation block 103 can include any number of any appropriate type of modulator, some embodiments, as shown in FIG. 3, include two modulators 310 and 312. Modulators 310 and 312 can be individual modulators or can be integrated into a single device. In some embodiments, modulators 310 and 312 are Mach-Zehnder modulators. Modulator 310, for example, can be utilized to generate a clock signal on the optical signal and modulator 312, for example, can modulate the optical beam according to data that is being optically transmitted. A dual modulator configuration may be appropriate for return-to-zero (Rz) optical encoding applications, for example. Other data encoding schemes may require a single modulator or may require more modulators.

FIG. 5B shows a block diagram for modulation controller 340 and optical power controller 350 of optical transmission controller 110. The embodiment of modulation controller 340 includes circuitry for two modulators, such as modulators 310 and 312 of FIG. 3. As shown in FIG. 3, an optical beam is received from optical fiber 101 and modulated in modulator 310 with a clock signal and modulated in modulator 312 with a data signal. Modulators 310 and 312 are driven by drivers 318 and 320, respectively. The output optical signal from modulator 312 is then input to variable optical attenuator 314 before being output to optical fiber 102. A portion of the optical output signal from VOA 316 is incident on photodiode 317, which provides an electrical current signal (PD-Power) indicative of the output power of the optical signal.

The signal PD-Power is received in optical output controller 350 of optical transmission controller 110 at transimpedance amplifier (TIA) 612, where it is converted to a voltage signal. The output signal from TIA 612 is input to variable gain amplifier 614. The output signal from variable gain amplifier 614 is input to ADC 616. The output signal from ADC 616 is input to adder 618, where it is compared with an output signal from power settings 620. Power settings 620 provides a voltage signal in response to a settable power parameter. The power parameter may be input to optical transmission controller 110 through interface 372 or stored as an operating parameter in memory 430. The error signal output from adder 618 is input to PD 610, which generates a new attenuation signal. The new attenuation signal is input to DAC 608. The analog signal from DAC 608 is input to VOA driver 606, which provides a VOA signal to control variable optical attenuator (VOA) 314 of modulation block 103.

The DC bias for each of modulators 310 and 312 is generated in modulation controller 340. As discussed above, modulators 310 and 312 can be Mach-Zehnder modulators. Mach-Zehnder modulators operate by dividing the beam into two arms, one of which has a phase added to the wavefront and the other has a phase subtracted from the wavefront (in a push-pull type Mach-Zehnder modulator). The additional phase is a result of the electro-optic effect, in which the index of refraction is a function of the voltage across a medium placed in the two beams. In some embodiments, the medium is a lithium niobate single crystal. The two beams are then recombined by an output coupler, such that their phases may either destructively or constructively interfere, depending on the magnitude and sign of the overall phase shift. Therefore, the output beam from the modulator is attenuated at the frequency of the voltage signal input to the modulator, and the amount of attenuation depends on the magnitude of the voltage applied to the modulator.

Figure 6:
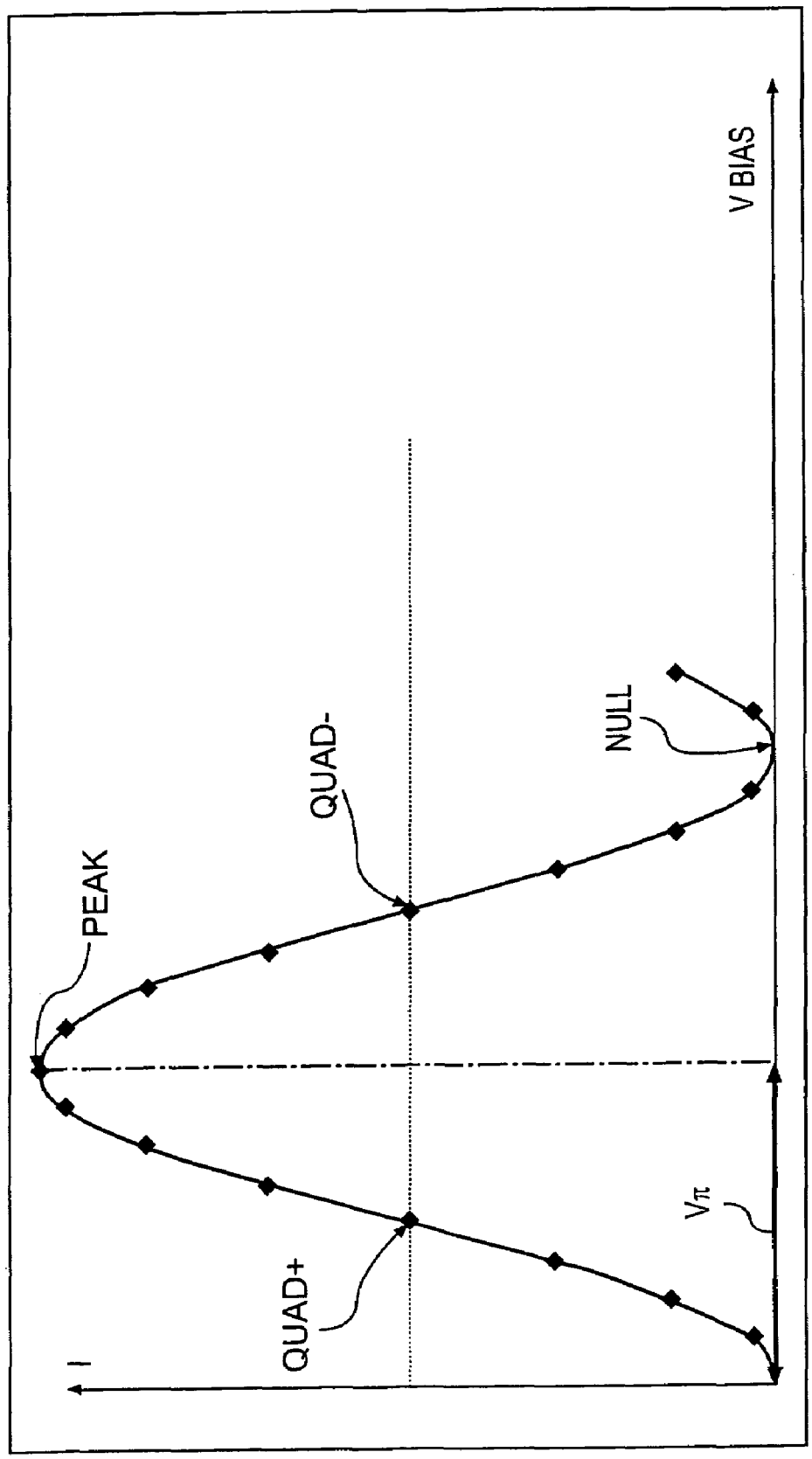
FIG. 6 shows a transfer function of a lithium niobate Mach-Zehnder modulator.

A typical curve of output signal versus input voltage for a Mach-Zehnder modulator, which can be utilized as modulator 310 or 312, is shown in FIG. 6. In operation, a Mach-Zehnder modulator is generally biased to a particular point on the output curve shown in FIG. 6 by a DC bias voltage applied to the DC input to the modulator. The bias voltage may place the operating point in a linear regime such as at the points indicated as Quad+ or Quad−, or, in some embodiments, the bias voltage may place the operating point at a place near the maximum output (Peak) or minimum output (Null). The signal voltage is then imposed on the bias voltage.

However, because the bias voltages tend to drift, an error signal is generated to lock the modulator at one of its operating points. In order to measure the error in the bias voltage, a dither signal (i.e., a small amplitude modulation of a particular frequency) is introduced to the modulator. There are several distinct modes for applying the dither signal.

As shown in FIG. 5B, modulation controller 340 includes circuitry for controlling both modulator 310 and modulator 312. In FIG. 5B, bias driver 562 provides the DC bias signal to the DC input terminal of modulator 310 and bias driver 596 provides the DC bias signal to the DC input terminal of modulator 312. Dither generator 556 provides a dither signal according to bias mode settings determined in bias mode 570. The analog dither signal can be added to the DC bias signal supplied to modulator 310 in bias driver 562. Similarly, dither generator 590 determines the dither signal from output signals from bias mode setting 604 and can be added to the DC bias signal supplied to the DC terminal of modulator 312 by bias drive 596. In some bias modes of operation, dither voltage signals can be added to the AGC signal to modulator drivers 318 and 320 rather than to the DC offset voltages to modulators 310 and 312.

The TIA output signal from TIA 612, which is related to the power of the optical signal output from VOA 314, is input to bandpass filters 560 and 594. Filter 560 filters the signal appropriately to output the signal amplitude at the dither frequency for the dither signal applied in bias driver 562 or AGC buffer 548. Filter 594 filters the signal appropriately to output the signal amplitude at the dither frequency for the dither signal applied in bias driver 596 or AGC buffer 582. In general, filters 560 and 594 provide the component of the signal from TIA 612 at the frequencies of the dither signals applied to modulators 310 and 312, respectively.

The output signal from filter 560 is input to ADC 558, where the sampling operation is synchronized with the phase of the dither signal generated by dither generator 556. The digital signal from ADC 558 is then sent to demodulator 568, which outputs a signal representing the bias drift amplitude and direction. The output signal from demodulator 568 is input to PID 566, which generates a new DC bias signal. The DC bias signal is input to DAC 564 and the analog signal from DAC 564 is then input to bias drive 562.

Similarly, the output signal from filter 594 is input to ADC 592, where the sampling operation is synchronized with the phase of the dither signal generated by dither generator 590. The digital signal from ADC 592 is then sent to demodulator 602. The output signal from demodulator 602 represents bias drift amplitude and direction and is input to PD 600, which generates a new DC bias signal. The DC bias signal is input to DAC 598 and the analog signal from DAC 598 is then input to bias drive 596.

In general, different dither modes and different dither frequencies are utilized in modulation control 340 for each of modulators 310 and 312. The circuitry providing the DC bias for modulator 310, then, locks into a different frequency component of the optical output signal than the circuitry providing the DC bias for modulator 312. Filter 560 and filter 594, then, provide different frequency components of the signal output by TIA 612.

Bias mode 570 and bias mode 604 control dither generator 556 and dither generator 590 to provide the appropriate dither signals for the different dither modes. A plurality of dither modes can exist, for example, square wave dither, gated square wave dither, or sine wave dither. The error signals obtained by locking onto the dither frequency in the optical output signal of the modulator is processed by demodulators 568 and 602.

As an example, assume that the transfer function of a lithium niobate amplitude modulator with Mach-Zehnder interferometer structure, utilized for one of modulators 310 and 312, has the form shown in FIG. 6, where the x-axis is the bias voltage and the y-axis is the optical power density. When referred to the Quad+ point (i.e., the DC bias voltage is set to about $V_\pi/2$) the optical output power can be expressed as $$P(V) = (P_m/2)(1 + \sin(V/V_\pi * \pi)). \quad (1)$$

However, when referred to the Peak point, the optical output power can be expressed as $$P(V) = (P_m/2)(1 + \cos(V/V_\pi * \pi)), \quad (2)$$

where, $P_m$ refers to the maximal output optical power; V is the voltage referred to as the locking point; and $V_\pi$ is the voltage required to drive the modulator output from minimum to maximum.

Practically, several voltages will be applied to the modulator simultaneously, including the DC bias voltage $V_{DC}$ to the DC port, the dither signal $V_D$ summed to the DC bias voltage $V_{DC}$, and the RF signal $V_{RF}$ to the RF port. These signals are in different frequency ranges; accordingly, the individual signals $V_\pi$ are different for each signal. Each signal will cause a phase change ($V/V_\pi * \pi$) to the reference point determined by its own $V_\pi$, and the modulator responds to the sum of all the phase changes. The output power at the various points, then, can be written as follows:

For Quad+, $$P(\theta) = P_m/2 + P_m/2 * \sin(\theta_{dc} + \theta_d + \theta_{rf}) \quad (3)$$

For Peak, $$P(\theta) = P_m/2 + P_m/2 * \cos(\theta_{dc} + \theta_d + \theta_{rf}) \quad (4)$$

where, $$\theta_{dc} = V_{dc}/V_{\pi dc} * \pi, \quad (5)$$

$$\theta_d = V_d/V_{\pi d} * \pi, \quad (6)$$

$$\theta_{rf} = V_{rf}/V_{\pi rf} * \pi, \text{ and} \quad (7)$$

$\theta_{dc}$, $\theta_d$, and $\theta_{rf}$ are the phases caused by the DC bias voltage, the dither signal and the RF signal respectively.

The magnitude of the bias control voltage is chosen to be of a value to bias the output curve of the modulator, such as that shown in FIG. 6, at one of its intended operating points, either Quad+, Quad−, peak or null. However, variations in the bias voltage output signal, especially with temperature, lead to errors in the exact bias point of the operation of the modulator. In order to measure the value of this error and to correct for it, the dither signal can be imposed upon the bias voltage, which dithers the voltage around the intended operating point. As discussed above and shown in FIG. 5B, the dither signal is generated by dither generator 556 for modulator 310 and by dither generator 590 for modulator 312. By measuring the strength of the signal component occurring at the dither frequency, the magnitude of the bias error can be determined. In general, the error has a functional dependence according to the bias mode with which the dither is generated and imposed to the modulator. The dither signal may be simply summed with the DC bias voltage and injected into the modulator by the DC input port, or the dither may be impressed upon the RF driving signal first, and input to the RF input port. In this latter case, no $\theta_d$ appears in Equations 3 and 4, but $\theta_{rf}$ in these two equations contains dither information.

In some embodiments, the relationship between the error signal and the dither signal in each bias mode can be shown to be one of the functions shown in FIG. 7C, depending on which control mode is selected. The functions shown in FIG. 7C can be derived from Equations 3 and 4 when the dither signals shown in FIGS. 7A and 7B are used and the RF input signal is assumed to be a sine wave or a square wave. FIG. 7A shows a square dither signal while FIG. 7B illustrates a gated square wave dither, which is a higher frequency square or sine wave modulated by a low frequency square wave.

For the functions shown in FIG. 7C, $\theta_{dc}$ is the phase angle (converted from a voltage, according to equation 5) of the DC component of the bias voltage, $\theta_d$ is the phase angle (converted from a voltage, according to equation 6) of the gated dither signal, and $\theta_{rf}$ is the amplitude of the RF signal. The paramter p is the modulation index, and BesselJ(0, $\theta_{rfa0}$) is a Bessel function of a first kind, wherein $$BesselJ(0, \theta_{rf0}) = \frac{1}{T}\int_{-\frac{T}{2}}^{\frac{T}{2}}\cos[\theta_{rfa}\sin(\omega_{rfa}t)]dt \quad (8)$$

$$= \frac{1}{2\pi}\int_{-\pi}^{\pi}\cos(\theta_{rfa}\sin\alpha)d\alpha$$

$$= \frac{1}{2\pi}\int_{-\pi}^{\pi}\cos(\theta_{rfa}\cos\alpha)d\alpha$$

Although the examples provided herein are specific to the Quad+ and Peak points bias control, similar embodiments can be obtained for Quad− and Null points bias control. The firmware operating the digital signal processor analyzes the output signal from the laser modulator, occurring at the dither frequency, according to the functional dependencies shown in FIG. 7C. A new bias voltage is then calculated by PID control loops 566 and 600, respectively, and a new bias voltage is generated by bias drivers 562 and 596.

Whichever bias control mode is selected for use, it can be implemented under firmware control. In the example illustrated in FIG. 3, two modulator drivers (modulator drivers 318 and 320) are provided, one for the clock signal generator and one for the data modulator. Modulator drivers 318 and 320 drive the RF input ports of modulator 310, the clock modulator, and modulator 312, the data modulator, respectively. In order to implement a RZ optical encoding scheme, the input signals to data modulator driver 320 may be a non-return to zero (NRZ) or Pseudo Random Bit Stream (PRBS) data stream and the input signal to clock modulator driver 318 may be a sine wave. The clock modulator may be biased at Peak point by using the bias mode of square dither to DC port for Peak control; the data modulator may be biased at Quad+ point by using the bias mode of square dither to modulator driver for Quad+ control.

In order to obtain a stable output RF power, many modulator drivers provide output power level control capability. As illustrated in FIG. 3, these drivers provide an output voltage terminal DET, which is usually differential, that reflects the detected RF output power, and a gain control input terminal AGC (or FC) that allows adjustment of the RF power. In the embodiment of the present invention shown in FIG. 3, a dual modulator driver AGC controller 342 is comprised in the modulation controller 340.

Modulator driver 342 includes two inputs, the clock signal and the gain control signal (AGC) from the gain modulator control circuitry of modulation controller 340. The gain control signal is input to the automatic gain control (AGC) port on the modulator driver. The output signal from of each of modulator drivers 318 and 320 is a voltage which is applied to the RF input of modulator 310 and modulator 312, respectively. The DC input signal to modulator 310 and modulator 312, as was discussed above, is generated by bias drivers 562 and 596, respectively, of modulation control circuit 340 according to the bias control mode determined in bias mode 604. The frequency of the dither signals is typically much lower than that of the RF signal from drivers 318 and 320, usually by at least about 50–100 times.

FIG. 5B illustrates a more detailed block diagram of modulation controller 340 with gain control circuitry. The detected output signal of modulator drivers 318 and 320 (DET) are differential voltages corresponding to the RF output power. As shown in FIG. 5B, the DET signal from modulator driver 318 is input to differential amplifier 538. The output signal from differential amplifier 538 is input to variable gain 540. The output signal from variable gain 540 is input to analog-to-digital converter 542. The digital signal from ADC 542 is input to adder 544, where it is compared with an output signal from RF power 546. RF power 546 sets a power level in response to an input signal from interface 372 or a value stored in memory 430. The error signal output from demodulator 544 is then input to PID 552, where a new gain is determined for modulator driver 318. The output signal from PID 552 is input to DAC 550 and the analog signal from DAC 550 is utilized in AGC buffer 548 to determine the input signal to the AGC input of modulator driver 318.

Similarly, the DET signal from modulator driver 320 is input to differential amplifier 572. The output signal from differential amplifier 572 is amplified in variable gain 574 and digitized in ADC 576. The digital output signal from ADC 576 is compared with an output signal from RF power 580 in adder 578. The signal generated from RF power 580 is responsive to a value input by interface 372 or a parameter stored in memory 430. The error signal output from adder 578 is input to PID 586, where a new gain value for modulator driver 320 is determined. The digital output signal from PID 586 is input to DAC 584 and the resulting analog signal is input to AGC buffer 582.

As has been previously discussed, in some bias modes the dither signal is added to the AGC signal of modulator drivers 318 and modulator driver 320 instead of the DC bias signal to modulators 310 and modulators 312. In some embodiments, the bias control mode for modulator 310 and the bias control mode for modulator 312 may be different. The bias control mode can be chosen in an external signal to interface 372 or by a value stored in memory 430, and dither generators 556 and 590 generate dither signals based on the selected bias mode and amplitude. The dither signal for modulator 310 is generated by dither generator 556 and inserted to AGC buffer 548 or bias driver 562, depending on the bias control mode. Similarly, the dither signal for modulator 312 is generated in dither generator 590 and applied to the AGC signal in AGC buffer 582 or to the DC bias signal in bias driver 596 dependent on the bias control mode for modulator 312.

In the embodiments shown in FIG. 5B, dither frequencies generated by dither generators 556 and 590 may be different so that filters 560 and 594 may differentiate bias drift information for modulators 310 and 312. In some embodiments, the same dither frequency may be utilized in both dither generators 556 and 590. In that case, only one dither frequency filter and digitizing circuit is required. In some cases, dither generators 556 and 590 may also be combined and can generate dither signals according to the bias mode setting for each channel. A dither switching circuit, then, switches the dither signal between the two channels alternately, with a switching frequency of about 5 Hz. Each of the channels is therefore controlled individually, one at a time.

Figure 8:
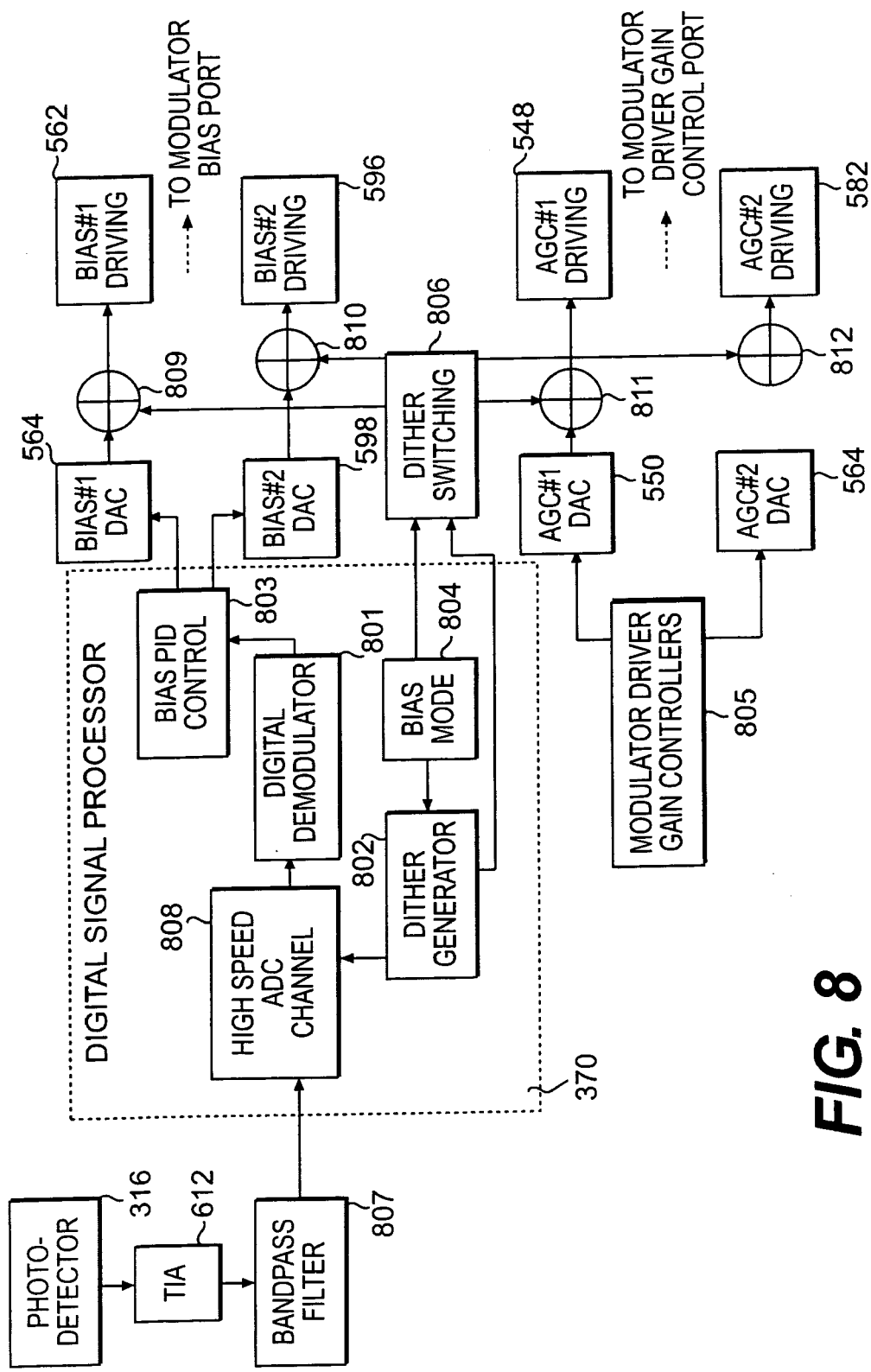
FIG. 8 shows further details of the dual channel bias controller.

FIG. 8 shows a block diagram illustrating the dither switching circuit. For simplification, the modulator driver gain control portion is not shown in detail. However, the gain control voltage driving circuits, including DAC registers 550 and 564 and voltage driving circuits 548 and 582 are shown. As was previously discussed, optical power is detected at photodetector 316 (FIG. 3) and a signal is received into optical transmission controller 110 at TIA 612. The output signal from TIA 612 is received at bandpass filter 807. The output signal from bandpass filter 807 is received into digital signal processor 370 at ADC 808, where the sampling operation is synchronized with the phase of the dither signal generated by dither generator 802. The signal corresponding to the current channel is demodulated in demodulator 801 and then sent to PID 803 to generate a replacement bias control signal, which is sent to bias DAC 564 and DAC 598 for output to bias drivers 596 and 562, depending on which channel is active. Additionally, dither signal generator 802 produces dither signal according to the bias mode of the current active channel and supplies that signal to dither switching 806, where the dither signal is switched to one of four destinations according to bias mode setting 804 and is summed into one of the output signals from DAC 564, DAC 598, DAC 550 or DAC 564 at adders 809, 810, 811 or 812, respectively. The output signal from adders 809, 810, 811 and 812 are received by drivers 562, 596, 548 and 582, respectively.

Therefore, dither switch 806 shown in FIG. 8 is a one-by-four switch, sending the output signal into one of four distinct paths. The first path is into the bias #1 driver 562, which provides the DC input signal to modulator 310. The second path is into the bias #2 driver 596, which provides the DC input signal to modulator 312. The third path is the gain control input signal to modulator driver 318. The fourth path is into the gain control input signal to modulation driver 320. The first path and the third path are for clock modulator 310 bias control, the second path and the fourth path are for data modulator 312 bias control. In some embodiments, the choice between modulator 310 and modulator 312 can be alternated with a switching frequency of about 5 Hz. However, the choice of sending the dither signal to the DC input ports of the data modulator and clock modulators (paths 1 and 2) or to the RF gain control pin of the data modulator and clock modulator (paths 3 and 4) can be determined by the bias mode setting.

The bias control modes and dithering methods supported by this invention include gated square dither to DC port for Quad control, square dither to DC port for Peak or Null control, and square dither to modulator driver gain control port for Quad control. Although the sinusoidal and square RF driving signals are used for analysis, the bias control methods discussed herein work with any analogue or digital driving signals.

The optical transmission controller described herein therefore controls all the necessary parameters to set up an optical transmission path, from the laser module operating conditions, to the modulators which impose the data pattern on the beam, to the optical beam output parameters. The circuit is user configurable, requiring the user inputs of laser current settings, temperature settings, wavelength setting, RF power settings, bias control mode, dither amplitude setting, and optical power setting.

The invention is not limited to the exemplary embodiments described above. For instance, the invention is not limited to any particular number of modulators, but can be applied to one or more modulators. The bias control modes are not limited to those specified herein, but will depend on the details of the application to which this invention is applied. Other embodiments and variations are within the scope of the invention, as defined by the appended claims.

I claim:

1. An optical transmission controller, comprising:
    a temperature controller, operative to digitally control the temperature of a laser module, wherein the temperature controller includes:
        a temperature detection circuit to receive signals from a temperature detector in the laser module and provide a temperature signal,
        a temperature control circuit coupled to receive the temperature signal from the temperature detection circuit and provide a control signal,
        an output driving circuit coupled to receive the control signal and provide a driving signal;
    a modulator bias controller coupled to digitally control the DC voltage levels applied to an optical modulator;
    an optical power controller, operative to digitally control an output power of the optical modulator;
    a wave-length controller, including:
        a wavelength receipt circuit coupled to receive signals related to the wavelength of light output by the laser module and generate a wavelength signal;
        a wavelength control circuit coupled to the wavelength receipt circuit, the wavelength control circuit comparing the wavelength signal with a predetermined wavelength signal to generate a control signal; and
        a temperature determination circuit coupled to select the predetermined signal in response to the predetermined wavelength signal.

2. The controller of claim 1, further including a laser current circuit to provide a settable amount of current to a laser diode in the laser module.

3. The controller of claim 1, wherein the temperature detection circuit receives signals from a thermistor placed in the laser module.

4. The controller of claim 1, wherein the output driving circuit provides the driving signal to a thermo-electrical-cooler (TEC) placed in the laser module.

5. The controller of claim 1, wherein the optical power controller comprises:
    a power monitoring circuit that generates a power signal in response to a signal related to the optical power;
    a power control circuit that generates a power control signal in response to a comparison between the power signal and a selectable power signal; and
    a power driver that generates a power driving signal in response to the power control signal.

6. The controller of claim 5, wherein the power driving signal controls a variable optical amplifier.

7. The controller of claim 5, wherein the signal related to the optical power originates from a photodiode sampling a portion of an optical output from the modulator.

8. An optical transmission controller, comprising:
    a temperature controller, operative to digitally control the temperature of a laser module, wherein the temperature controller includes:
        a temperature detection circuit to receive signals from a temperature detector in the laser module and provide a temperature signal,
        a temperature control circuit coupled to receive the temperature signal from the temperature detection circuit and provide a control signal, wherein the temperature control circuit compares the temperature signal with a pre-determined setting in a proportional-integral-differential control algorithm to determine the control signal,
        an output driving circuit coupled to receive the control signal and provide a driving signal;
    a modulator bias controller coupled to digitally control the DC voltage levels applied to an optical modulator;
    an optical power controller, operative to digitally control an output power of the optical modulator; and
    a wavelength controller, comprising:
        a wavelength receipt circuit coupled to receive signals related to the wavelength of light output by the laser module and generate a wavelength signal;

a wavelength control circuit coupled to the wavelength receipt circuit, the wavelength control circuit comparing the wavelength signal with a predetermined wavelength signal to generate a control signal; and a temperature determination circuit coupled to select the predetermined signal in response to the predetermined wavelength signal.

9. A method for controlling a modulator bias of a Mach-Zehnder interferometer, the method comprising:

generating a dither signal and summing the dither signal with the DC bias voltage for input to the DC input port of the Mach-Zehnder interferometer;

receiving a signal related to optical output power from the Mach-Zehnder interferometer;

recovering a feedback signal relating to the optical output power signal having frequencies of the dither signal;

detecting bias drift information from a frequency component of the signal related to the frequency of the dither signal; and generating a DC bias voltage signal in response to the drift information.

10. A method for controlling a modulator bias of a Mach-Zehnder interferometer, the method comprising:

generating a dither signal and summing the dither signal with an automatic gain control signal to control an RF signal applied to the Mach-Zehnder interferometer;

receiving a signal related to optical output power from the Mach-Zehnder interferometer;

recovering a feedback signal relating to the optical output power signal having frequencies of the dither signal;

detecting bias drift information from a frequency component of the signal related to the frequency of the dither signal; and generating a DC bias voltage signal in response to the drift information.

11. An optical transmission controller, comprising:

a temperature controller, operative to digitally control the temperature of a laser module;

a modulator bias controller coupled to digitally control the DC voltage levels applied to an optical modulator; wherein the modulator bias controller comprises:

a dither signal generating circuit that generates at least one dither signal, a dither signal buffering circuit to provide the at least one dither signal to a modulator, an optical power detection circuit that generates a power signal related to the optical power output from the modulator, at least one bandpass filter to receive the power signal and recover feedback signals related to components of the power signal having frequencies of the at least one dither signal, a signal processing unit to detect drift in the bias voltage from the feedback signals, and a bias voltage driving circuit coupled to provide DC voltages to the modulator; and an optical power controller, operative to digitally control an output power of the optical modulator.

12. The controller of claim 11, wherein the dither signal is applied to the DC voltage to the modulator.

13. The controller of claim 11, wherein the dither signal is applied to an RF driving voltage to the modulator.

14. The controller of claim 11, wherein the at least one dither signal includes dither signals applied to a plurality of modulators.

* * * * *